United States Patent [19]

Satran et al.

[11] Patent Number: 4,462,725
[45] Date of Patent: Jul. 31, 1984

[54] METAL CUTTING TOOLS WITH REPLACEMENT INSERT

[75] Inventors: Amir Satran, Kiriat Bialik, Israel; Andre Brasey, Villarsiviriaux, Switzerland

[73] Assignee: Iscar Ltd., Nahariya, Israel

[21] Appl. No.: 335,432

[22] Filed: Dec. 29, 1981

[30] Foreign Application Priority Data

Jan. 8, 1981 [IL] Israel ........................................ 61884
Mar. 9, 1981 [CH] Switzerland ........................ 1589/81

[51] Int. Cl.$^3$ .............................................. B26D 1/00
[52] U.S. Cl. ........................................ 407/92; 407/94; 407/108; 407/113
[58] Field of Search .................... 407/113, 120, 94, 95, 407/77, 86, 87, 92, 98, 108, 111, 112

[56] References Cited

U.S. PATENT DOCUMENTS

| | | | |
|---|---|---|---|
| 1,328,947 | 1/1920 | Dover | 407/112 |
| 2,370,273 | 2/1945 | Ulliman | 407/86 |
| 3,754,309 | 8/1973 | Jones et al. | 407/113 |
| 3,821,837 | 7/1974 | Heinrich et al. | 407/113 |
| 3,889,331 | 6/1975 | Grungras | 407/92 |
| 3,981,057 | 9/1976 | Koppers | 407/113 |
| 4,035,887 | 7/1977 | Hertel | 407/120 |
| 4,169,690 | 10/1979 | Kendra | 407/113 |
| 4,230,427 | 10/1980 | Belttari et al. | 407/113 |

FOREIGN PATENT DOCUMENTS 902193 7/1962 United Kingdom ................ 407/87

Primary Examiner—Lowell A. Larson
Attorney, Agent, or Firm—Ladas & Parry

[57] ABSTRACT

A cutting tool having a longitudinal insert comprising two opposed cutting edges that enable the position of the insert to be reused after a rotation of 180° about a certain axis.

6 Claims, 16 Drawing Figures

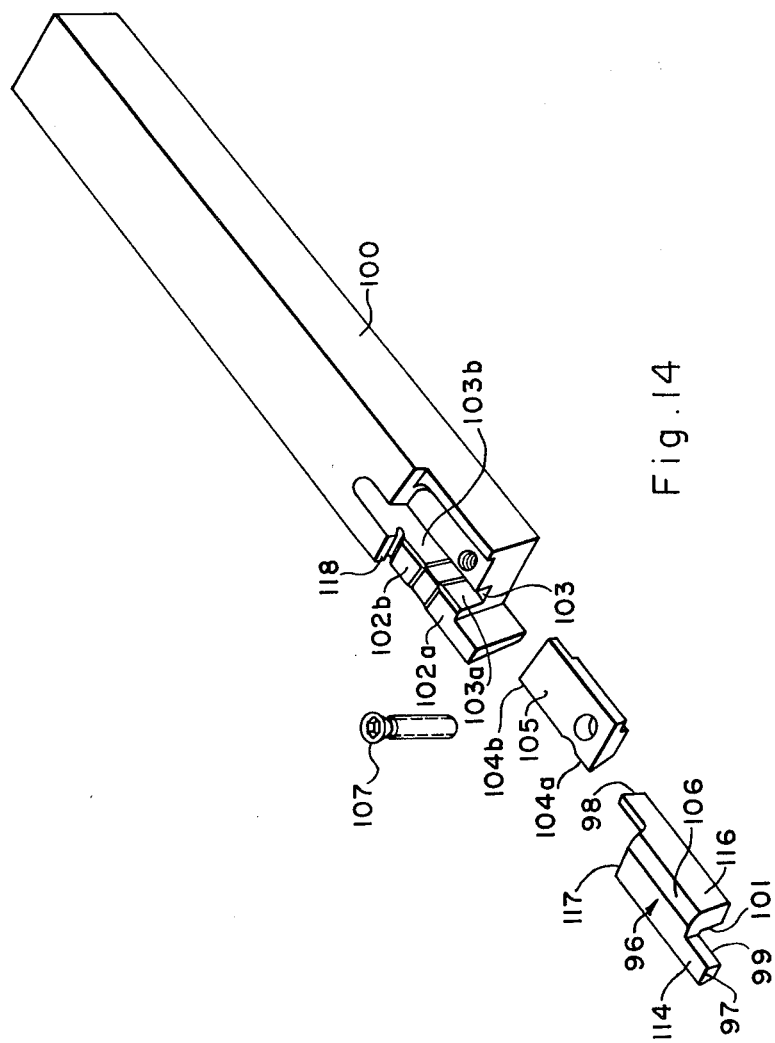

METAL CUTTING TOOLS WITH REPLACEMENT INSERT

FIELD OF THE INVENTION

This invention is concerned with metal cutting tools and more particularly to such tools using replaceable inserts.

BACKGROUND OF THE INVENTION

The use of hard metal cutting inserts in cutting tools is now commonplace. Such inserts are normally placed on the tool holder or shank by some type of clamping device. The problems with using clamping devices are compounded when used with small tools. Thus, for example, the smaller clamps are more difficult to fabricate and the size of the clamp relative to the small tool is relatively larger. Thus on small cutting tools the inserts are normally brazed onto the tool holder or mounted with a screw going through the insert to avoid disadvantages accruing due to the use of clamping devices. A disadvantage of clamping devices that is magnified with small size tools is that the shank or tool holder must be inserted and held in the bore of the machine tool post. With the clamp in place the shank cannot fit through the bore and thus can be mounted from only one side. On some machine tools all of the shanks of the tool holders must be mounted by passing the insert end of the shank through the bore.

For the most part cutting tools with inserts are used either for longitudinal turning operations or for cut-in operations. One of the reasons for the noted specialization of the machine tools to either turning or cut-in operations is that in cut-in operations the actual cutting portion of the tool must extend a relatively large distance beyond the tool holder. Thus the insert must be properly clamped and sufficiently strong to withstand the force caused by the cutting.

Accordingly it is an object of the present invention to provide new and improved cutting tools in which the above referred to disadvantages are substantially reduced or overcome.

SUMMARY OF THE INVENTION

According to the present invention a metal cutting tool is provided comprising:
a tool shank having a cutting end therein;
seat means in said cutting end;
cutting insert means fitting onto said seat means,
clamp means for securing said cutting insert to said seat means, and
the cross-sectional dimensions of the cutting end of said tool with the insert clamped in place being sized to enable the cutting end of the tool to pass through a bore nominally large enough to admit the shank therethrough.

Another feature of the invention is that the cutting insert has two oppositely disposed cutting surfaces and has support surfaces distinct from said cutting surfaces located to support said insert in said seat means regardless of which cutting surface is being used.

Thus the cutting tool features stepped and elongated inserts firmly supported on the shank so as to enable approximately 20 percent of said insert to extend from the shank whereby the tool is adapted for both cut-in and longitudinal turning operations.

BRIEF DESCRIPTION OF THE DRAWINGS

The operation and utilization of the present invention will become more fully apparent from the description of a preferred embodiment taken in conjunction with the accompanying drawings, in which:

FIG. 14 is an exploded view of yet another embodiment of the cutting insert and tool holder;

GENERAL DESCRIPTION

Figure 1:
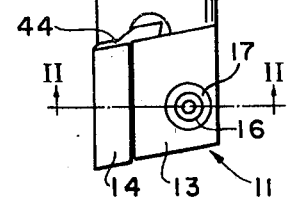
FIG. 1 is a plan view of the inventive cutting tool.

In the preferred embodiment of the tool 11 shown in FIG. 1, there is included a tool holder or shank 12, a clamp 13 and an elongated cutting insert 14. The clamp is operated using a counter-sunk threaded fastener 16 shown as having a wrench receiving socket head 17.

Figure 2:
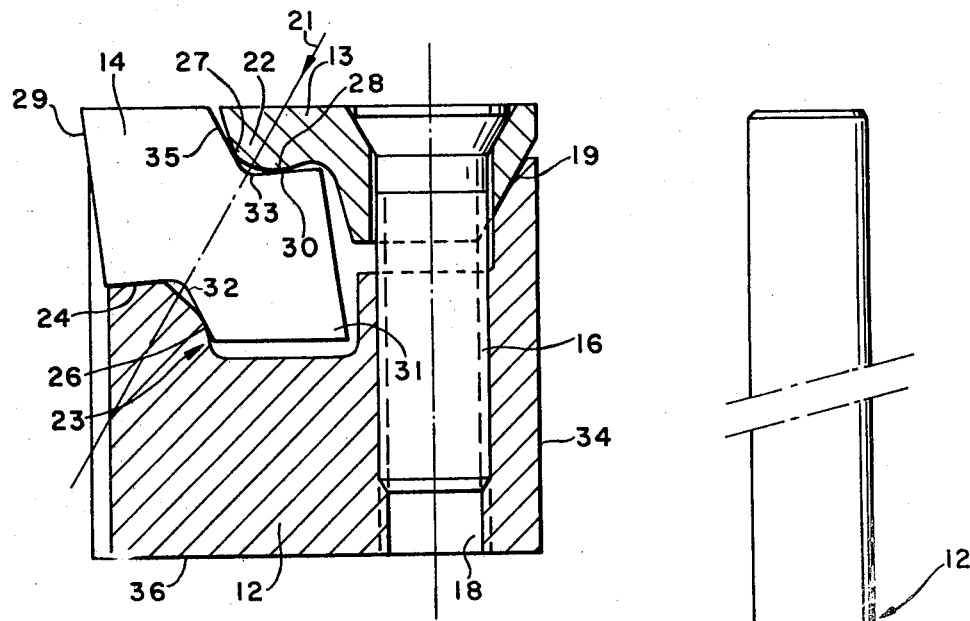
FIG. 2 is a sectional view taken on a plane 2—2 and looking in the direction of the arrows.

As best seen in FIG. 2 the cross-sectional dimension of the cutting end of the tool, i.e. the end with the cutting insert 14, has substantially the same cross-sectional dimensions as the rest of the shank. The threaded fastener 16 is inserted into a threaded bore 18 in the shank 12 and the threaded fastener is used to tighten and loosen the clamp 13. Tightening of the threaded fastener forces the clamp downward and simultaneously outward because of the biased surfaces 19 between the clamp 13 and the shank 12. Thus tightening fastener 16 forces the elongated clamp to abut the insert 14, and a clamping force is applied along the vector 21. The clamp has an arcuate abutting end shown as clamp end 22 which as the threaded fastener 16 is tightened, is forced against the insert 14 pushing the insert against the seat 23 of the shank. The seat is characterized so that in the cross-sectional view there are shown two surfaces of contact 24 and 26 between the seat and the insert countering the two surfaces of contact 27 and 28 between the clamp end 22 and the insert. Also, note that there is a space 25 between the cutting means 31 and the seat. This ensures proper positioning of the insert regardless of the integrity of the cutting means, i.e. the cutting means are not the support surfaces. When the clamp screw is tightened down the cross-sectional dimension of the cutting end is substantially the same as the cross-sectional dimension of the entire shank.

Note that the insert is shown as having two cutting surfaces 29 and 31 oppositely disposed on the insert. The cutting surfaces are defined by two diagonally opposite longitudinal edges of the insert. The insert in a preferred embodiment is characterized by oppositely disposed recesses 32 and 33 which are used as positioning and locking planes for assuring that the insert when locked in place on the seat is positioned accurately relative to the shank sides 34 and 36, for example, and consequently to the longitudinal axis of the shank.

Figure 3:
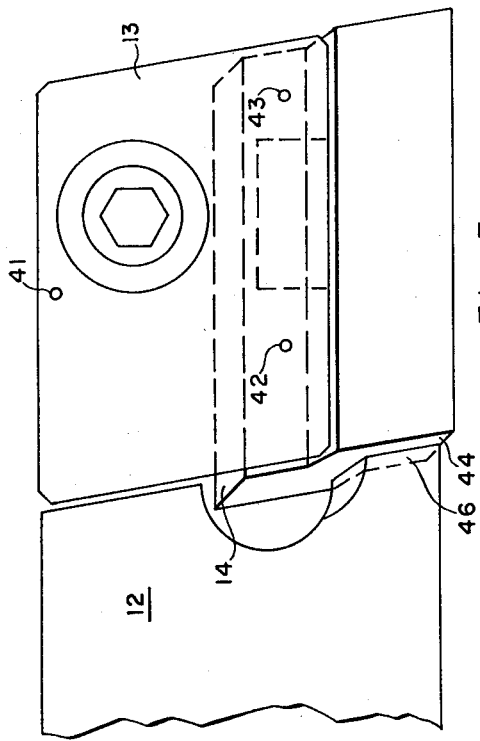
FIG. 3 is a more detailed plan view of the cutting insert end of the cutting tool.
Figure 4:
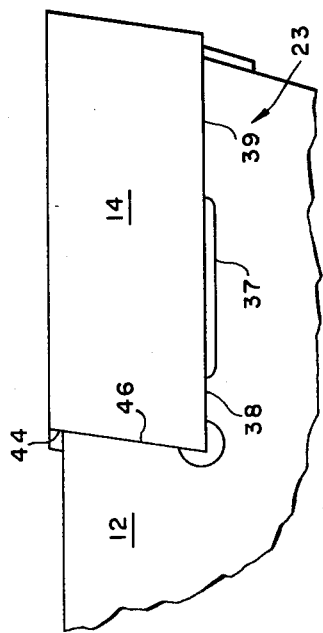
FIG. 4 is a side view of the cutting insert end of the cutting tool.

As best seen in FIG. 4 the seat 23 is recessed at 37 which divides the positioning plane of the seat in a longitudinal direction to two separate abutment portions 38 and 39. Also, in the longitudinal direction the clamp rests on three points 41, 42 and 43 shown in FIG. 3. Points 42 and 43 are on the clamp in arcuate end 22 that are in juxtaposition to the insert opposite and in proximity to the abutment portions of the seat 38 and 39. Point 41 is the portion of the clamp that abuts the shank at biased walls 19. The rear side 44 of the insert is used as a fixed plane in the longitudinal direction and abuts against seat defining wall 46 of the shank.

In the cross-sectional dimension the clamp has three points of contact. These are on the abutting surfaces between the clamp and the shank, i.e. surfaces 19, contact point 28 on the graduated portion of the cutting insert, i.e. the surface 30 that is approximately parallel to the top and bottom surfaces of the shank and contact point 27 on the biased surface 35 of the insert.

The graduated form of the tool insert and the recess 25 between the inner cutting surface 31 and the shank 12 enables the insert to be accurately seated and firmly clamped in place in the seat independently of the form and shape of the cutting edges. The seating is sufficiently solid and stable to enable approximately 20 percent of the insert length to extend or project from the tool holder. The projecting part of the insert is shaped to adapt the tool to perform cut-in operations in addition to elongated turning operations.

While FIGS. 1 to 4 showed a preferred embodiment of the invention, other embodiments also fall within the scope of the invention. For example, it is not absolutely necessary to use inserts having graduated dimensions for clamping, seating and positioning purposes.

Figure 5:
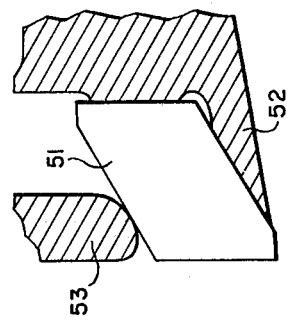
FIG. 5 is a portion of a sectional view of the inventive tool with a differently shaped cutting insert.
Figure 6:
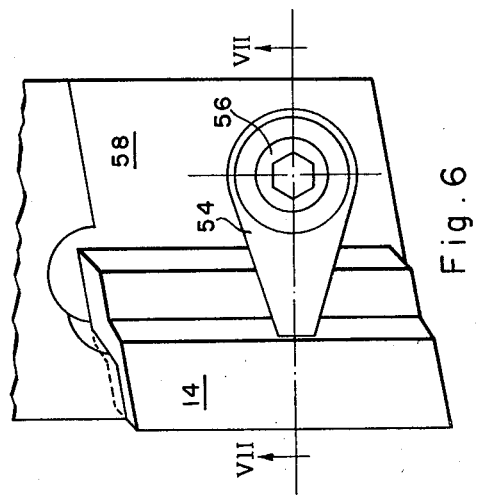
FIG. 6 is a plan view of the cutting insert end of the cutting tool using a different clamping arrangement.
Figure 7:
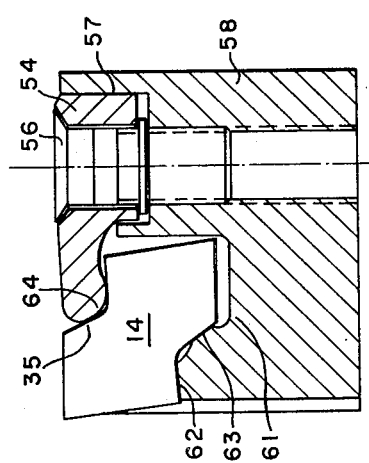
FIG. 7 is a sectional view of the clamping arrangement of FIG. 6 taken on plane 7—7 and looking in the direction of the arrows.

The inventive tool can be used with other shaped inserts, such as, for example insert 51 shown in FIG. 5. The cutting insert 51 is shown as being basically rhomboidally shaped without graduated sides for the clamping and positioning purposes. The seat 52 and the clamp 53 are also shown in FIG. 5 as being different than the seat and clamp of FIGS. 1 to 4. Thus the seat has to be shaped so as to receive and counter the forces applied through the clamp element 53. It is not shown in FIG. 5 how the clamp element is actuated, since the focus or feature of the invention employed by FIG. 5 is that the tool with the clamp and the insert therein must have cross-sectional dimensions that are substantially the same as the cross-sectional dimensions of the rest of the shank. To further illustrate variations in the inventive structure, FIGS. 6 and 7 show a different type of clamping arrangement than the preferred embodiment shown in FIGS. 1 to 4. The clamp as best seen in the plan view, is a smaller clamp instead of the elongated clamping arrangement of FIGS. 1 to 4. The clamp element 54 of FIG. 6 is also tightened by a wrench operated threaded fastener 56. However it should be noted, as particularly shown in FIG. 7, that the clamping arrangement does not use any wedge effect based on biased meshing walls. Instead the walls of the clamp 54 and shank 58 mesh in a vertical plane 57. Fastener 56 merely pulls the clamp 54 down against the insert 14. The seat arrangement 61 other than the land of the biased wall is almost the same as the seat 23 of FIGS. 1 to 4. For example, in the sectional view, there are two planes 62 and 63 that receive and counter the clamping forces. The arcuate end 64 of clamp 54 pushes against the biased side 35 of the insert 14 to apply biased forces on the insert for forcing the insert against seat 61. The biased forces and the downward forces against side 30 also provide a biased vector force not shown in the drawings.

Figure 8:
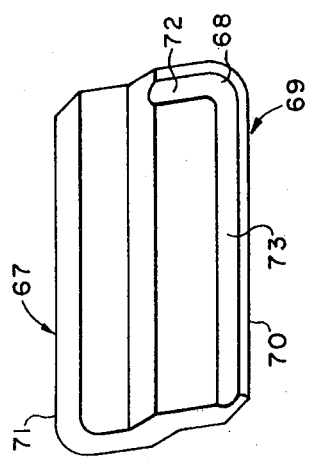
FIG. 8 shows the cutting insert such as that shown in FIG. 1 having a chip-forming groove adjacent the cutting end.

The embodiment of the insert 67 shown in FIG. 8 is similar to insert 14 but includes a groove 68 adjacent the cutting face 69 defined by edge 70. While it cannot be seen in FIG. 8, it should be understood that a similar groove is adjacent the edge 71 which is diagonally oppositely disposed to the edge 70. The groove serves the function of forming the chips as they are machined from the work piece. Note that the groove 68 extends in two directions, that is part of the groove 72 extends transverse to the longitudinal axis of the insert 67 and another portion 73 of the groove extends parallel to the longitudinal axis of the insert. These groove portions serve the function of chip forming when the tool is used for cutting-in operations and for turning operations respectively.

Figure 12:
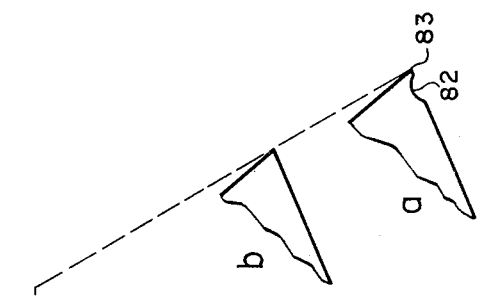
FIGS. 12a and 12b show modified cutting edges on the cutting tool of FIG. 9.
Figure 9:
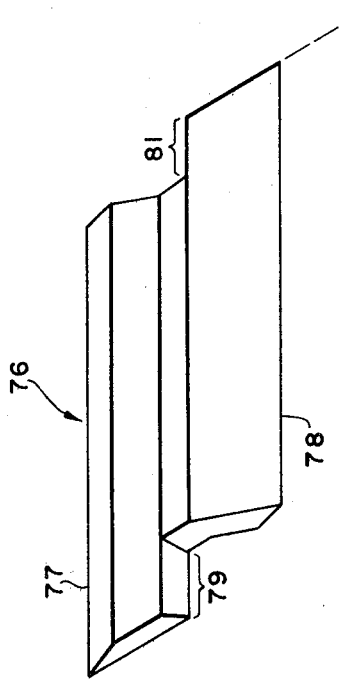
FIG. 9 shows a modified cutting insert for the inventive cutting tool wherein the portions having the opposite cutting surfaces are displaced from each other.
Figure 11:
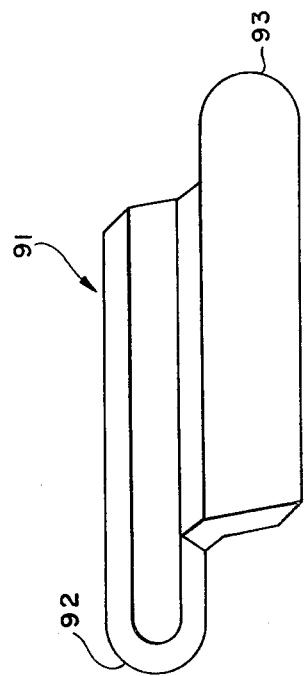
FIG. 11 is yet another modified version of the cutting insert shown in FIG. 9 wherein the cutting means are rounded.
Figure 10:
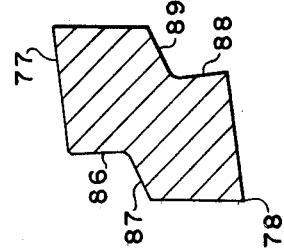
FIG. 10 is a sectional view of the cutting insert of FIG. 9.

The embodiments of the tool inserts 76 and 91 particularly shown in FIGS. 9 to 11 are adapted for use in cut-in and longitudinal turning operations. The main feature of the inserts in FIGS. 9 to 11 are the symmetry of each cutting edge portion. Thus in FIGS. 9 and 10 there is a cutting edge 77 and a cutting edge 78. The tool portion that has the cutting edge 78 is removed from the tool portion that has the cutting edge 77 by a horizontally displaced amount 79. Similarly there is a horizontal displacement 81 on the other side of the insert so that no matter which way the tool is placed in the seat to expose the cutting edge 77 or cutting edge 78, the tool extends about 20 percent of its length beyond the support of the seat. At the same time there is an unusual amount of support surface abutting the seat thereby providing a stable and secure seating arrangement even though the insert extends so much beyond the tool holder. FIGS. 12a and 12b show the tool insert 76 with different cutting angles. The showing of FIG. 12b indicates the cutting edge 83 and a chip forming slot 82. The tool 76 of FIG. 9 is shown in cross-section in FIG. 10. The support and locating surfaces are shown as surfaces 86, 87, 88 and 89.

The tool insert 91 of FIG. 11 is fabricated in the same manner as the insert 76 of FIGS. 9 and 10 except that cutting edges are shown as arcuate edges 92 and 93.

Figure 13:
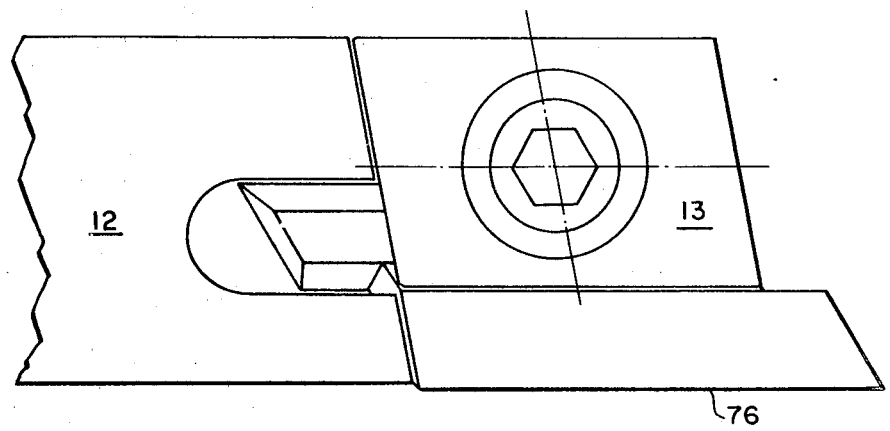
FIG. 13 is a plan view of the tool with the insert of FIG. 9 clamped thereon.

The insert 76 is shown clamped onto the seat of shank 12 by clamp 13 in FIG. 13. It is apparent from the drawing that after the cutting means 77 is sufficiently worn, the clamp is loosened, the insert removed and turned around and replaced on the holder with the cutting means 78 available for cut-in operations.

Figure 16:
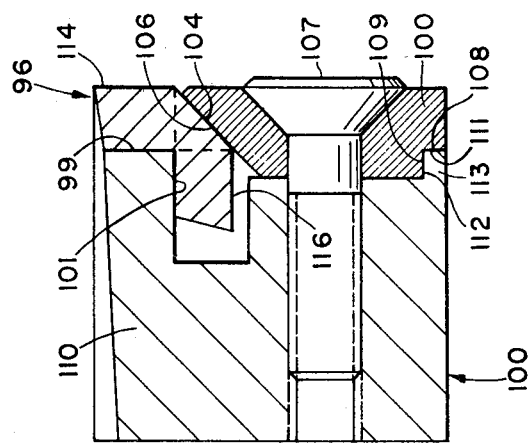
FIG. 16 is a sectional view taken along plane XVI in FIG. 15.
Figure 15:
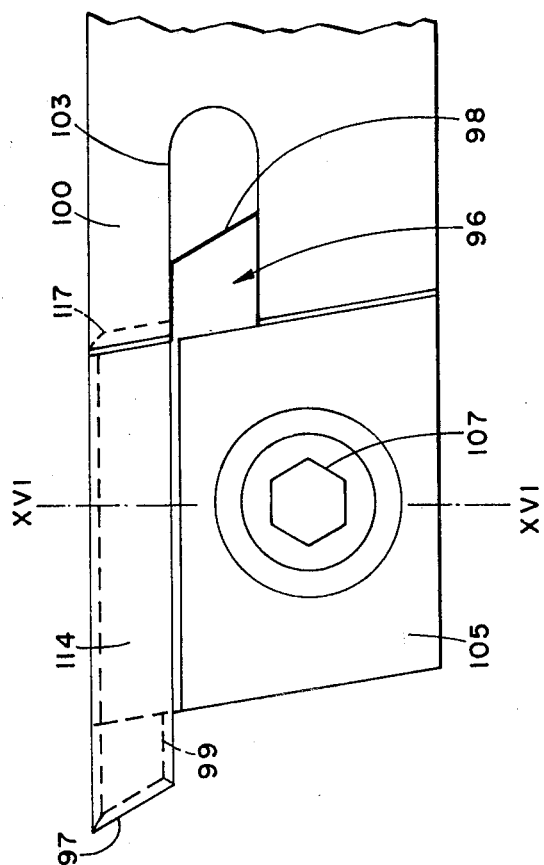
FIG. 15 is a plan view of the cutting insert of FIG. 14.

The embodiment of FIGS. 14, 15 and 16 shows an insert 96 having two oppositely disposed cutting ends 97 and 98. The configuration of the insert enables either cutting end to be used while the insert is clamped onto the holder 100. The figure shows the insert in place with surfaces 99 and 101 abutting the slot surfaces 102a, 102b and 103a, 103b of holder 100 respectively. The clamp surfaces 104a, 104b of clamp 105 abuts the surface 106 of the insert. The clamp is tightened down by means such as clamp screw 107. The clamp surfaces 108 and 109 abut wall surfaces 111 and 112 of wall 113, for stabilization purposes.

Similarly insert surface 117 is shown abutting holder surface 118.

To use cutting edge 98 the tool is turned so that surface 116 replaces surface 114 at the top of the tool holder and tool assembly. Surface 99 then is juxtaposed to surfaces 103a and 103b while surface 101 abuts surfaces 102a and 102b. Surface 106 is juxtaposed to surfaces 104a and 104b of the clamp.

In operation, the tool is first assembled. The screw clamp is loosened, a cutting insert is placed on the seat and the clamp is tightened down. With the clamp tightened down the shank has the same cross-sectional dimensions throughout including the dimensions of the cutting end of the tool. The insert can thereby be placed onto the seat, the screw tightened and the entire tool can be placed through the bore of a tool post even when there is not sufficient room to insert the tool holder with the cutting end of the shank going into the bore first. The tool is supported along the seat with sufficient stability to enable the tool cutting insert to extend approximately 20 percent of its length past the shank, thereby enabling the use of the tool for cut-in operations as well as longitudinal turning operations. The insert with its symmetrical stepped configuration exposes at least one support surface of the clamp and two support surfaces to the seat regardless of which of the two diagonally disposed cutting portions are used.

While the principles of the invention have been described above in connection with specific apparatus and locations, it is to be understood that this description is made by way of example only and not as a limitation on the scope of the invention.

What is claimed is:

1. A metal cutting tool comprising an elongated tool shank having a cutting end formed at one end thereof; an elongated pocket formed in the cutting end and being longitudinally directed with respect to the tool shank; wall means of said pocket including a longitudinally directed side wall adjacent a longitudinally directed side surface of said shank; a pair of axially directed pocket surfaces angularly directed with respect to each other and defining between them a first elongated corner means, at least one of said pocket surfaces being located on said side wall; an elongated cutting insert comprising an elongated intermediate portion of said insert, a pair of cutting portions of said insert extending substantially colinearly from either end of said intermediate portion, each cutting portion being formed with respective longitudinally transversely directed cutting edges, said insert being receivable and invertible in said pocket so that at any time one cutting portion extends beyond the cutting end and the other cutting portion and the intermediate portion are retained within the pocket; said intermediate portion having a pair of elongated insert surfaces angularly directed with respect to each other and defining between them a second elongated corner means which mates with said first elongated corner means so that when either of said cutting portions extend beyond the cutting end, the longitudinally directed cutting edge thereof is substantially parallel to and slightly offset with respect to an outer surface of said side wall; and clamping means mounted on said shank and adapted to exert a transversely directed clamping force on said cutting insert, said force having orthogonally directed components which respectively clamp the insert surfaces against the respective pocket surfaces; the cross-sectional dimensions of said cutting end with the cutting insert clamped in position being such as to enable said cutting end to pass through a bore nominally large enough to admit said tool shank therethrough.

2. A metal cutting tool according to claim 1 wherein said pocket surfaces are constituted by orthogonally directed surfaces of said side wall which define between them a first elongated convex corner means.

3. A metal cutting tool according to claim 1 wherein said pocket surfaces are respectively constituted by a surface of said side wall and by an orthogonally directed base surface of said surface which define between them a first elongated concave corner means.

4. A metal cutting tool according to claim 2 wherein said cutting insert is of substantially prismatic shape, said longitudinally directed cutting edges being respectively formed on one pair of diagonally opposite corners of the insert, and opposite pair of diagonally opposite corners being longitudinally recessed to form a pair of longitudinally directed recesses, each said recess being formed with said pair of elongated insert surfaces; the arrangement being such that as either longitudinal cutting edge extends beyond the cutting end, said pocket surfaces mate in one of said longitudinal recesses and said clamping means acts on the other of said longitudinal recesses.

5. A metal cutting tool according to claim 4 wherein said claimping means comprises a clamping plate formed on one longitudinal edge thereof with a tapering surface and on an opposite longitudinal edge thereof with a clamping rib, said cutting end being formed with a longitudinally directed tapering surface upon which the tapering surface of the clamping plate bears and screw means for screw coupling said clamping plate to said cutting end, the arrangement being such that with said clamping ribs lodged in one of said longitudinal recesses and with said tapering surfaces bearing one on the other, continued screw tightening of said clamping plate towards said cutting end results in a transversely directed resultant force being exerted on said insert.

6. A metal cutting tool according to claim 2 wherein said intermediate portion of said insert is of substantially L-shaped cross-section having a pair of elongated limbs, having inner surfaces which constitute said elongated insert surfaces; a pair of oppositely directed elongated extensions of said limbs respectively constituting said cutting portions and screw clamping screw coupled to said cutting end and adapted on an outer portion of said intermediate portion so that continued screw tightening of said screw clamping means results in a transversely directed resultant force being exerted on said insert.

* * * * *